2,895,954
SYNTHESIS OF STEROIDS

Josef Fried and Josef E. Herz, New Brunswick, N.J., assignors to Olin Mathieson Chemical Corporation, New York, N.Y., a corporation of Virginia No Drawing. Application October 11, 1956
Serial No. 615,237

5 Claims. (Cl. 260—239.55)

This application is a continuation-in-part of our parent application, Serial No. 598,539, filed July 18, 1956.

This invention relates to the synthesis of valuable steroids and has for its objects the provision of: (I) an advantageous process of preparing steroids of the $\Delta^{1,4,13}$-18-nor-17α-pregnatriene series having an 11-keto, 11β-hydroxy or 11β-acyloxy substituent; (II) certain new compounds useful themselves as physiologically active steroids; and (III) certain new compounds useful in the preparation of said physiologically active steroids.

The process of this invention essentially comprises: (a) interacting a 21-organic sulfonic acid ester of $\Delta^{1,4}$-pregnadiene-11β,17α,21-triol-3,20-dione with anhydrous potassium fluoride to yield $\Delta^{1,4}$-pregnadiene-17α,21-oxido-11β-ol-3,20-dione; (b) oxidizing the latter, if desired, to the corresponding 11-keto derivative; (c) rearranging the 11β-hydroxy derivative, either by heating with a dilute acid or by treating with hydrogen fluoride, to the corresponding $\Delta^{1,4}$-17β-methyl-18-nor-17α-pregnadiene-13α,21-oxido-11β-ol-3,20-dione; (d) oxidizing the 11β-hydroxy steroid, if desired, to the corresponding 11-ketone; and (e) treating the 11β-hydroxy-norpregnadiene with hydrogen fluoride to yield $\Delta^{1,4,13}$-17β-methyl-18-nor-17α-pregnatriene-11β,21-diol-3,20-dione, which in turn can in the usual manner be oxidized to its 11-keto derivative (after protection of the 21-hydroxyl group by acylation), monoesterified to yield the 21-monoester or diesterified (if an 11β-hydroxy starting material is used) to yield an 11β,21-diester derivative. The final $\Delta^{13}$-steroids can also be prepared directly from the 17α,21-epoxide derivatives, without isolation of the rearranged intermediate, by treating the latter with hydrogen fluoride.

The novel compounds of this invention comprise intermediate 17α,21-epoxides, which possess glucocorticoid activity and, hence, can be used in lieu of hydrocortisone in the treatment of rheumatoid arthritus; these are of the general formula

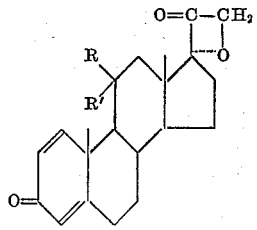

wherein R is hydrogen, R' is β-hydroxy or together R and R' is keto. The novel compounds of this invention also comprise intermediate 13α,21-epoxides of the general formula

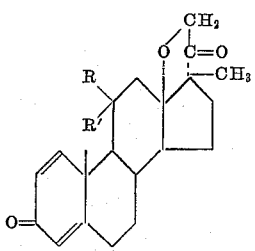

wherein R and R' are as above defined.

The final products of this invention, which have utility both as mineralocorticoids (and hence may be used instead of desoxycorticosterone acetate in the treatment of Addison's disease) and as androgens (and hence may be used instead of methyltestosterone in the treatment of gonadal failure in males, or instead of testosterone propionate in the treatment of menopausal disturbances) comprise compounds of the general formula

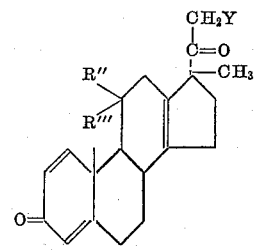

wherein R" is hydrogen, R''' is β-hydroxy or β-acyloxy, or together R" and R''' is keto, and Y is hydroxy or acyloxy. In both instances, the acyloxy substituent is preferably the acyloxy radical of a hydrocarbon carboxylic acid having less than ten carbon atoms, as exemplified by the lower alkanoic acids (e.g., acetic acid), the lower alkenoic acids (e.g., acrylic acid), the monocyclic aromatic carboxylic acids (e.g., benzoic acid), the monocyclic aromatic lower alkanoic acids (e.g., phenacetic acid), the cycloalkane carboxylic acids (e.g., cyclopropanecarboxylic acid) and the cycloalkene carboxylic acids (e.g., cyclohexenecarboxylic acid).

The process of this invention can be illustrated by the following schematic presentation:

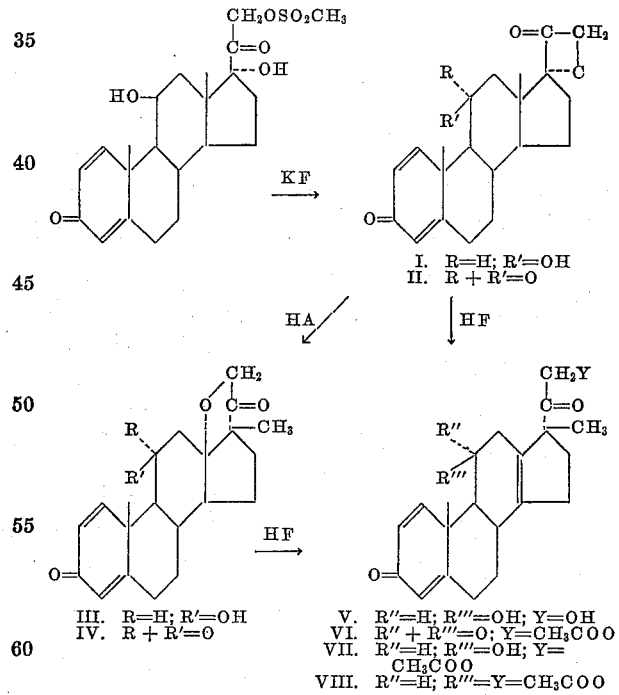

To prepare the 17α,21-epoxides of this invention (Compounds I and II), a 21-organic sulfonic acid ester of $\Delta^{1,4}$-pregnadiene-11β,17α,21-triol-3,20-dione (e.g., a lower alkanesulfonate, such as mesylate, and an aryl sulfonate, such as tosylate) is reacted with potassium fluoride. This reaction is preferably conducted under substantially anhydrous conditions in an organic solvent of high dielectric constant, such as dimethylformamide, dimethylsulfoxide or diethylene glycol, optimally at an elevated temperature (e.g., 90–120° C.). If Compound II is desired, Compound I, initially formed, is oxidized in the usual manner, as by treatment with a hexavalent chromium compound (e.g., chromic acid) to yield the corresponding 11-keto derivative.

The 11β-hydroxy-17α,21-epoxide can then be rearranged to the 18-nor-17α-pregnadiene derivative by either heating with a dilute acid (HA), such as dilute mineral acid as exemplified by dilute sulfuric acid, the heating being preferably done in the temperature range of about 60° C. to about 100° C., or by treatment with hydrogen fluoride in an organic solvent at a low temperature (e.g., below room temperature) for a short period of time (e.g., about 30 minutes). The reaction results in the formation of $\Delta^{1,4}$ - pregnadiene - 17β - methyl - 18 - nor-17α - pregnadiene - 13α,21 - oxido - 11β - ol - 3,20 - dione (Compound III), which can be oxidized in the usual manner to the 11-ketone (Compound IV), or treated with hydrogen fluoride for more than thirty minutes to yield $\Delta^{1,4,13}$ - 17β - methyl - 18 - nor -17α - pregnatriene-11β,21-diol-3,20-dione (Compound V). If an 11β-hydroxy steroid is employed as a starting material and an 11-keto steroid is desired, the initially resulting 11β-hydroxy steroid can be oxidized with chromic acid (after protection of the 21-hydroxyl group as by monoacetylation) to the ketone (Compound VI). To prepare 21-esters, the 11β-hydroxy steroid is reacted with an acylating agent such as an acid anhydride or an acyl halide (e.g., acetic anhydride or benzoyl chloride) in the presence of a tertiary base (e.g., pyridine). The nature of the ester derivative will depend on the mole ratio of esterifying reagent to steroid. If a one to one mole ratio is used, then a 21-monoester is formed; if, however, two or more moles of acylating agent is employed per mole of steroid, then an 11β,21-diester is the product.

The $\Delta^{13}$-steroid can also be formed directly from the 17α,21-epoxy steroid (without separation of the initial rearranged intermediate) by treating the latter with hydrogen fluoride for more than thirty minutes.

The following examples illustrate the invention (all temperatures being in centigrade):

EXAMPLE 1

$\Delta^{1,4}$-pregnadiene-17α,21-oxido-11β-ol-3,20-dione (I)

A solution of 1 g. of $\Delta^{1,4}$-pregnadiene-11β,17α,21-triol-3,20-dione 21-mesylate and 1.0 g. of anhydrous potassium fluoride in 50 ml. of dimethylsulfoxide is heated at 110° with stirring for 24 hours. After cooling, the mixture is diluted with ice water and the resulting precipitate (about 570 mg.) filtered off and washed with water. The precipitate is separated by extraction with hot chloroform into the chloroform-insoluble 21-fluoro-$\Delta^{1,4}$ - pregnadiene - 11β,17α - diol - 3,20 - dione and the chloroform-soluble $\Delta^{1,4}$ - pregnadiene - 17α,21 - oxido-11β - ol - 3,20 - dione. The chloroform - soluble fraction (about 365 mg.) is dissolved in 4 ml. of chloroform and 8 ml. of benzene and chromatographed on 7.3 of acid-washed alumina. A mixture of 1 part chloroform and 2 parts benzene (450 ml.) elutes about 220 mg. of $\Delta^{1,4}$-pregnadiene - 17α,21 - oxido - 11β - ol - 3,20 - dione, which after recrystallization from 95% alcohol has the following properties: M.P. about 243–244°; $[\alpha]_D^{23}$ +182° (c., 0.48 in chloroform);

$\lambda_{max.}^{alc.}$ 243 mμ (ε = 15,400); $\lambda_{max.}^{Nujol}$ 2.99μ, 5.53μ, 6.03μ, 6.20μ, 6.26μ

Analysis.—Calcd. for $C_{21}H_{26}O_4$ (342.42): C, 73.66; H, 7.66. Found: C, 73.58; H, 7.48.

EXAMPLE 2

$\Delta^{1,4}$-pregnadiene-17α,21-oxido-3,11,20-trione (II)

To a solution of 150 mg. of $\Delta^{1,4}$-prenadiene-17α,21-oxido-11β-ol-3,20-dione (I) in 20 ml. of acetone is added with stirring at room temperature 0.3 ml. of a solution of 200 mg. of chromic acid and 320 mg. of sulfuric acid in 1 ml. of water. After 20 minutes, a few drops of alcohol are added; and after the addition of 5 ml. of water, the acetone is removed in vacuo. The residual suspension is extracted with chloroform and the chloroform extract washed with water, sodium bicarbonate and again with water, dried over sodium sulfate and evaporated to dryness in vacuo. The crystalline residue of the 11-ketone (II) after recrystallization from 95% alcohol has the following properties: M.P. about 236–237°: $[\alpha]_D^{23}$ +249° (c., 1.00 in chloroform);

$\lambda_{max.}^{alc.}$ 237 mμ (ε = 16,200); $\lambda_{max.}^{Nujol}$ 5.02μ, 5.87μ, 6.04μ, 6.18μ, 6.26μ

Analysis.—Calcd. for $C_{21}H_{24}O_4$ (340.42): C, 74.09; H, 7.11. Found: C, 74.22; H, 7.06.

EXAMPLE 3

$\Delta^{1,4}$ - 17β - methyl - 18 - nor - 17α - pregnadiene - 13α, 21-oxido-11β-ol-3,20-dione (III)

A solution of 300 mg. of $\Delta^{1,4}$-pregnadiene-17α,21-oxido-11β-ol-3,20-dione is refluxed in 60 ml. of methanol and 1.92 ml. of 8.5% sulfuric acid for 1.5 hours. After neutralization with sodium bicarbonate, the methanol is removed in vacuo and the resulting suspension extracted with chloroform, the chloroform extract dried over sodium sulfate and the solvent removed in vacuo. The resulting product after recrystallization from 95% ethanol gives pure $\Delta^{1,4}$-17β-methyl-18-nor-17α-pregnadiene - 13α,21 - oxido - 11β - ol - 3,20 - dione (III) of the following properties: M.P. about 218–219°; $[\alpha]_D^{23}$ +19° (c., 1.15 in CHCl$_3$);

$\lambda_{max.}^{alc.}$ 242.5 mμ (15,800); $\lambda_{max.}^{Nujol}$ 2.98, 5.70, 6.03, 6.20μ

Analysis.—Calcd. for $C_{21}H_{26}O_4$ (342.42): C, 73.66; H, 7.66. Found: C, 73.56; H, 7.67.

EXAMPLE 4

$\Delta^{1,4}$ - 17β - methyl - 18 - nor 17α - pregnadiene - 13α,21-oxido-3,11,20-trione (IV)

238 mg. of $\Delta^{1,4}$-17β-methyl-18-nor-17α-pregnadiene-13α-21-oxido-11β-ol-3,20-dione (III) is oxidized in 20 ml. of acetone with 100 mg. CrO$_3$, as described in Example 2. The resulting 11-ketone (IV) after recrystallization from 95% alcohol has the following properties: M.P. about 192–194°; $[\alpha]_D^{23}$ −20° (c., 1.35 in CHCl$_3$);

$\lambda_{max.}^{alc.}$ 240 mμ (15,400); $\lambda_{max.}^{Nujol}$ no OH, 5.73, 5.81–5.85, 6.00, 6.15, 6.25μ

Analysis.—Calcd. for $C_{21}H_{24}O_4$ (340.40): C, 74.09; H, 7.11. Found: C, 74.40; H, 6.93.

EXAMPLE 5

$\Delta^{1,4,13}$ - 17β - methyl - 18 - nor 17α - pregnatriene - 11β, 21-diol-3,20-dione (V)

Into a solution of 200 mg. of $\Delta^{1,4}$-pregnadiene-17α, 21-oxido-11β-ol-3,20-dione in 19 ml. of chloroform and 1 ml. of alcohol is passed at 0° with stirring hydrogen fluoride gas until two layers develop. The resulting mixture is allowed to remain at 0° for 1 hour and 20 minutes and is then neutralized by the addition of an aqueous suspension of sodium bicarbonate. The layers are separated and the chloroform phase washed with water, dried over sodium sulfate and evaporated to dryness in vacuo. The residue (about 220 mg.) is dissolved in 5 ml. of chloroform and 10 ml. of benzene and chromatographed on 4 g. of acid-washed alumina. Elution of the column with chloroform-benzene 1:2 (500 ml.) and 1:1 (300 ml.) produces crystalline material (about 117 mg.) which after recrystallization from acetone-hexane has the following properties: M.P. about 196–198° after prior melting at 157–158° and resolidification; $[\alpha]_D^{23}$ +181° (c., 1.10 in CHCl$_3$);

$\lambda_{max.}^{alc.}$ 239 mμ (14,400); $\lambda_{max.}^{Nujol}$ 2.88, 3.02, 5.90, 6.05, 6.20–6.24

*Analysis.*—Calcd. for $C_{21}H_{26}O_4$ (342.42): C, 73.66; H, 7.66. Found: C, 73.85; H, 7.42.

When the above reaction is run for a period of ½ hour, $\Delta^{1,4}$-17β-methyl-18-nor-17α-pregnadiene-13α,21-oxido-11β-ol-3,20-dione is isolated as the major reaction product by recrystallization from acetone.

$\Delta^{1,4,13}$-17β-methyl-18-nor-17α-pregnatriene-11β,21-diol-3,20-dione can also be prepared from $\Delta^{1,4}$-17β-methyl-18-nor-17α-pregnadiene-13α,21-oxido-11β-ol-3,20-dione, as illustrated by the following example:

EXAMPLE 6

$\Delta^{1,4,13}$-*17β-methyl-18-nor-17α-pregnatriene-11β,21-diol-3,20-dione (V)*

A solution of 20 mg. of $\Delta^{1,4}$-17β-methyl-18-nor-17α-pregnadiene-13α,21-oxido-11β-ol-3,20-dione in 19 ml. of chloroform and 1 ml. of alcohol is treated with hydrogen fluoride, as described in Example 5. The reaction product, upon recrystallization from acetone-hexane, gives pure $\Delta^{1,4,13}$-17β-methyl-18-nor-17α-pregnatriene-11β,21-diol-3,20-dione (V), identified by infrared comparison with an authentic sample.

Compound V can be esterified and oxidized by procedures illustrated in the following three examples:

EXAMPLE 7

$\Delta^{1,4,13}$-*17β-methyl-18-nor-17α-pregnatriene-11β,21-diol-3,20-dione 21-acetate (VII)*

76 mg. of $\Delta^{1,4,13}$-17β-methyl-18-nor-17α-pregnatriene-11β,21-diol-3,20-dione is dissolved in 1.92 ml. of a solution containing 11.6 mg. of acetic anhydride in 1 ml. of pyridine. After 15 hours at room temperature, the reagents are removed in vacuo and the residue dissolved in 6 ml. of benzene and 3 ml. of hexane. Chromatography on 2 g. of acid-washed alumina produces about 75 mg. of crystalline material in the benzene eluates (500 ml.) and in the chloroform-benzene eluates 1:9 (300 ml.), which after recrystallization from acetone-hexane and drying at 100° in vacuo has the following properties: M.P. about 157–158°; $[\alpha]_D^{23}$ +179° (c., 0.53 in $CHCl_3$);

$\lambda_{max.}^{alc.}$ 239 mμ (15,700); $\lambda_{max.}^{Nujol}$ 2.86, 3.02, 5.70, 5.80, 6.04, 6.22–6.24μ

*Analysis.*—Calcd. for $C_{23}H_{28}O_5$ (384.45): C, 71.85; H, 7.34. Found: C, 71.95; H, 7.40.

EXAMPLE 8

$\Delta^{1,4,13}$-*17β-methyl-18-nor-17α-pregnatriene-21-ol-3,11,20-trione 21-acetate (VI)*

To a solution of 20 mg. of $\Delta^{1,4,13}$-17β-methyl-18-nor-17α-pregnatriene-11β,21-diol-3,20-trione 21-acetate in 0.5 ml. of pyridine is added a suspension of 17 mg. of chromic acid in 0.5 ml. of pyridine. 18 hours later water is added and the resulting mixture extracted with chloroform. The chloroform extract is washed with water, dried over sodium sulfate and the solvent removed in vacuo. The residue, upon crystallization from acetone-hexane, furnishes $\Delta^{1,4,13}$-17β-methyl-18-nor-17α-pregnatriene-21-ol-3,11,20-trione 21-acetate (VI).

Compound VI can be saponified in the usual manner, as by treatment with potassium carbonate in methanol, to yield the free 21-hydroxy steroid.

EXAMPLE 9

$\Delta^{1,4,13}$-*17β-methyl-18-nor-17α-pregnatriene-11β,21-diol-3,20-dione 11β,21-diacetate (VIII)*

Acetylation of 15 mg. of $\Delta^{1,4,13}$-17β-methyl-18-nor-17α-pregnatriene-11β,21-diol-3,20-dione with 0.5 ml. of pyridine and 0.5 ml. of acetic anhydride at room temperature produced, after removal of the reagents, an amorphous diacetate, $\lambda_{max.}^{CHCl_3}$ no OH, 5.77, 6.00, 6.15, 6.22μ

The invention may be otherwise variously embodied within the scope of the appended claims.

We claim:

1. A compound selected from the group consisting of $\Delta^{1,4}$-17β-methyl-18-nor-17α-pregnadiene-13α,21-oxido-11β-ol-3,20-dione and $\Delta^{1,4}$-17β-methyl-18-nor-17α-pregnadiene-13α,21-oxido-3,11,20-trione.

2. A compound of the general formula

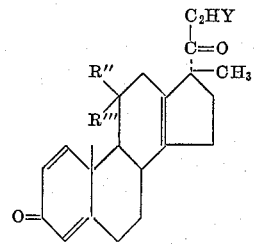

wherein R″ is hydrogen, R‴ is selected from the group consisting of β-hydroxy and β-acyloxy, and together R″ and R‴ is keto, and Y is selected from the group consisting of hydroxy and acyloxy, the acyloxy radical in both instances being the acyloxy radical of a hydrocarbon carboxylic acid having less than ten carbon atoms.

3. $\Delta^{1,4,13}$-17β-methyl-18-nor-17α-pregnatriene-11β,21-diol-3,20-dione.

4. An acetic acid ester of $\Delta^{1,4,13}$-17β-methyl-18-nor-17α-pregnatriene-11β,21-diol-3,20-dione.

5. A process for preparing $\Delta^{1,4}$-pregnadiene-17α,21-oxido-11β-ol-3,20-dione which comprises interacting a 21-organic sulfonic acid ester of $\Delta^{1,4}$-pregnadiene-11β,17α,21-triol-3,20-dione with potassium fluoride and recovering the $\Delta^{1,4}$-pregnadiene-17α,21-oxido-11β-ol-3,20-dione formed.

References Cited in the file of this patent

Hirschmann et al.: J.A.C.S. 78, September 20, 1956, page 4814.

UNITED STATES PATENT OFFICE
Certificate of Correction

Patent No. 2,895,954                                                            July 21, 1959

Josef Fried et al.

It is hereby certified that error appears in the printed specification of the above numbered patent requiring correction and that the said Letters Patent should read as corrected below.

Column 2, lines 35 to 45, the right-hand formula should appear as shown below instead of as in the patent—

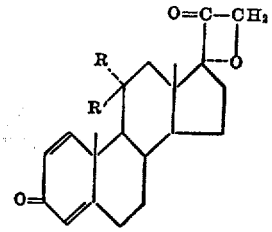

column 3, line 29, for "pyriidne" read —pyridine—; line 57, for "on 7.3 of" read —on 7.3 g. of—; column 5, line 16, for "20 mg." read —200 mg.—.

Signed and sealed this 8th day of December 1959.

[SEAL]

Attest:
KARL H. AXLINE,
*Attesting Officer.*

ROBERT C. WATSON,
*Commissioner of Patents.*